Jan. 25, 1966  J. MARVIN ETAL  3,230,580
METHOD FOR RECOVERING FLESH FROM BIVALVE MOLLUSKS
Original Filed Feb. 7, 1963  2 Sheets-Sheet 1
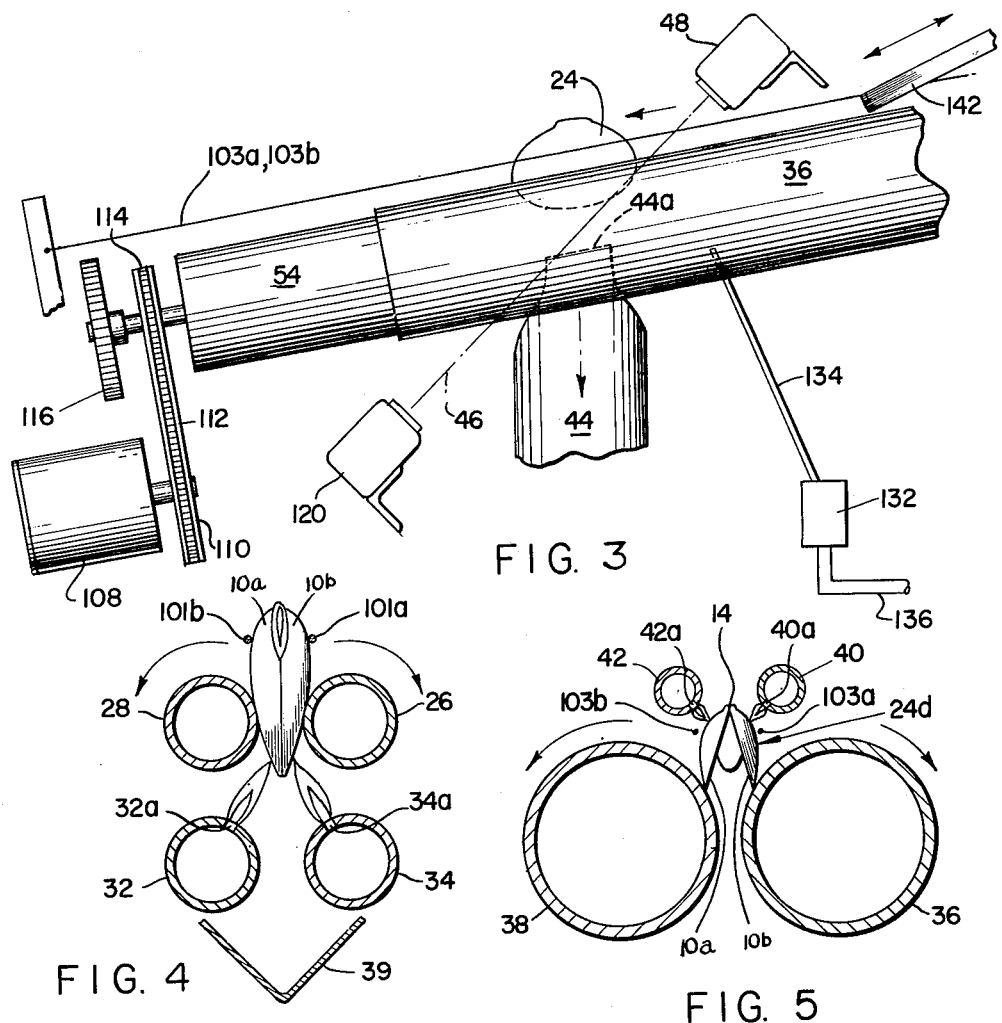
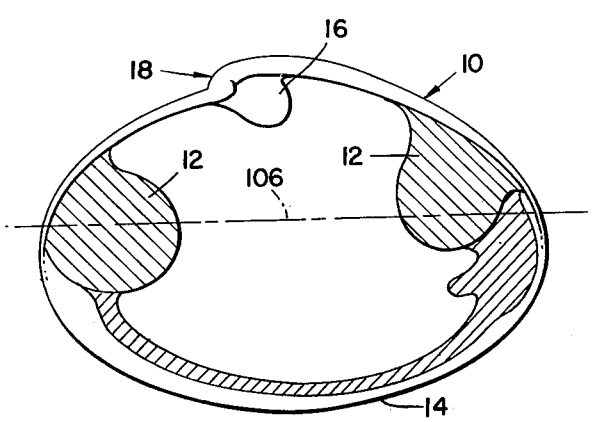
INVENTORS
JOHN MARVIN
THOMAS HENDERSON, JR.
BY
Blair & Buckles
ATTORNEYS

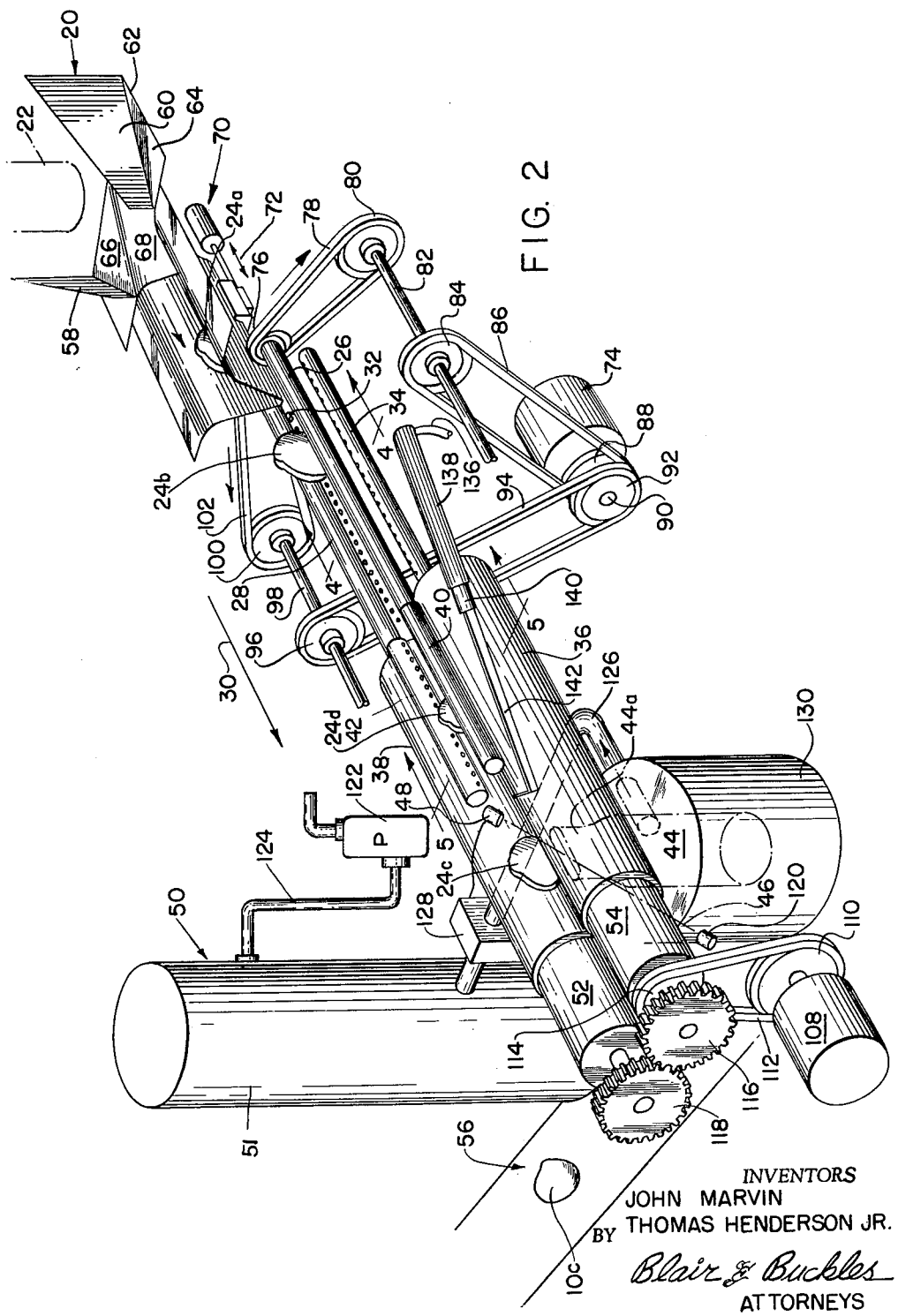

United States Patent Office 3,230,580
Patented Jan. 25, 1966

3,230,580
METHOD FOR RECOVERING FLESH
FROM BIVALVE MOLLUSKS
John Marvin, 805 Brush Hill Road, Milton, Mass., and
Thomas Henderson, Jr., 3 Forest Glen Drive E.,
Millville, N.J.
Original application Feb. 7, 1963, Ser. No. 256,941.
Divided and this application June 15, 1964, Ser. No. 374,910
11 Claims. (Cl. 17—45)

This application is a division of application Serial Number 256,941 filed February 7, 1963.

This invention relates to a method for recovering the flesh from a bivalve mollusk without noticeably cooking the flesh.

More specifically, it relates to opening a bivalve mollusk by standing it on edge with its hinge portion substantially uppermost and heating it in this position. This releases the connection between the adductor muscles and the shells so that its hinge ligament separates the shells, thereby exposing the animal's flesh. Thereafter, the flesh may be readily removed from the opened shells.

As will be explained more fully hereinafter, it is desirable to drain juice from the mollusk prior to opening its shells. This is achieved by heating the mollusk's mantle to release it from the shells to drain the juice through the opening thus formed.

The bivalve mollusk remains alive and uncooked throughout this process, so that it maintains maximum commercial value. Moreover, substantially none of the flesh remains on the shells. A further feature of the invention is that it can be practiced with automatic machinery; no skilled manual labor is required.

Bivalve mollusks, such as clams, scallops, oysters and mussels, have two main shells or valves joined together by a hinge and held shut by powerful adductor muscles. Bivalves such as scallops and oysters containing one such muscle are termed monomyrians. Others, known as dimyrians which include clams and mussels contain two adductor muscles. The present invention is suitable for recovering the flesh from both kinds of bivalves.

When a bivalve mollusk is caught and taken out of its natural environment, its adductor muscles become taut and pull the two shells together against the force exerted by a ligament in the hinge. To recover the flesh of the bivalve, these adductor muscles must be released from the shells.

Most prior shell opening techniques accomplish this by inserting a knife between the lips of the two shells to sever the adductor muscles; the ligament adjacent the hinge then opens the shell so the flesh can be removed.

This technique requires substantial skilled hand labor. Moreover, a portion of the adductor muscle, a culinary delicacy of commercial value, generally remains attached to the shell and is thus lost.

Other prior methods involve exposing the bivalve to very high temperatures for brief periods to open the bivalve and for removal of its muscle and other flesh; such high temperatures materially downgrade the quality of the meat by partially cooking it, which whitens the meat. Since premium prices are obtained for fresh uncooked shelled bivalves which are translucent in appearance, indicating freshness, such cooking action is to be avoided; also cooked shell fish meat deteriorates more rapidly.

Accordingly, an object of this invention is to provide an improved method for recovering the flesh from a bivalve mollusk.

Another object of this invention is to provide a method for removing the flesh from a bivalve mollusk without appreciably cooking it.

Another object of the invention is to provide a method of the above character for removing essentially all of the flesh from the mollusk's shell, thus avoiding waste.

Yet another object of the invention is to provide a method of the above character wherein the juices of the mollusk are efficiently removed for commercial use.

A further object of the invention is to provide a method of the above character for opening and shucking mollusks which is readily applicable to continuous, mass production techniques.

Other objects of the invention will in part be obvious and will in part appear hereinafter.

The invention accordingly comprises the several steps and the relation of one or more of such steps with respect to each of the others which will be exemplified in the method hereinafter disclosed, and the scope of the invention will be indicated in the claims.

For a fuller understanding of the nature and objects of the invention, reference should be had to the following detailed description taken in connection with the accompanying drawings, in which:

FIGURE 1 is a simplified lateral view of the interior of a typical bivalve mollusk shell;

FIGURE 2 is a schematic perspective view of a clam opening and shucking machine embodying the invention;

FIGURE 3 is a schematic fragmentary elevational view of the flesh removing portion of the machine shown in FIGURE 2;

FIGURE 4 is a cross-sectional view, taken along line 4—4 of FIGURE 2, showing the portion of the machine where the mantle is released; and FIGURE 5 is a cross-sectional view, taken along line 5—5 of FIGURE 2, showing the portion of the machine of FIGURE 2 where the adductor muscles are released.

Similar reference characters refer to similar parts throughout the several views of the drawings.

In prior bivalve mollusk openers using heat, the mollusk lies flat during heating. It has now been found that a considerable portion of the flesh, lying against the bottom shell, is partly cooked from the heat of the shell. This disadvantage is avoided in the present invention, wherein a vibratory feeder automatically orients the mollusk on edge and then deposits the mollusk between two rollers which move the on-edge mollusk past a heater. The heat, applied to the shells adjacent the adductor muscles, releases them from the shells.

When the mollusk is on edge during heating, the flesh is suspended within the shells and tends to pull away from the shells except near adductor muscles. The resultant space between the shells and the flesh insulates the flesh from the heat being applied; thus no noticeable cooking of the flesh occurs. It has also been found that these prior openers using heat retain the juice in the shells which becomes sufficiently hot to help cook the flesh. The present invention solves this problem by first heating the mantle to separate it from the shells to drain excess juice from the mollusk prior to heating the shells to release the adductor muscles.

Referring now to FIGURE 1, shell 10 has two glossy portions 12, known as the ciboria, where the adductor muscles (not shown) are attached to the shell. The mantle (not shown) is attached to the shell 10 along its edge 14 at a region termed the pallial line.

An elastic ligament 16, compressed when the clam is closed, connects the two shells of the clam at its hinge portion 18. When the adductor muscles are relaxed by the clam or released as described herein, the compressed ligament 16 forces the shells apart so the flesh within may be removed as will be more fully described later.

Turning now to FIGURE 2, the machine for recovering flesh from bivalve mollusks such as a clam has a feeding hopper generally indicated at 20 for receiving clams from a feeding spout 22, and guiding them on edge, as illustrated by the clam 24a. Feeding hopper 20 deposits the clams between two parallel rotating rollers 26 and 28, inclined from the feeder downwardly to move clams such as clam 24b away from the feeding hopper, in the direction of arrow 30. The rollers 26 and 28 are constructed to position each clam with its hinge portion 14 uppermost.

As best seen in FIGURES 2 and 4, the clams are carried by rollers 26 and 28 past a pair of burners 32 and 34 from which flames hit the clam along areas adjacent the mantle edge 14 (FIGURE 1). This heating releases the mantle from the shells, and the juice drains into a trough 39 as seen in FIGURE 4 (the trough 39 is omitted from FIGURE 2). The juice can be drained from the trough to conventional processing machinery.

The drained clams are then dropped from rollers 26 and 28 to a second pair of rollers 36 and 38, which rotate and are inclined downwardly to carry the clams in the direction of arrow 30.

A pair of gas pipes 40 and 42 extend along rollers 36 and 38 as shown in FIGURES 2 and 5 to direct flames against the upper portions of the clams such as clam 24d, which as noted are adjacent the adductor muscles of the clam. The adductor muscles are thus detached from the shells, and as best seen in FIGURE 5, the hinge ligament separates the shells 10a and 10b so that each clam rises away from the nip of the rollers because of the force exerted by such ligaments. Referring now to FIGURES 2 and 3, the opened clams such as clam 24 pass over a shucking nozzle 44 to interrupt a beam of light 46 to a photoelectric cell 48 which signals a vacuum system indicated at 50 which applies a vacuum to the nozzle. This vacuum draws the exposed flesh into the nozzle 44, shucking it from each opened clam such as claim 24 thereafter dropping such flesh into a tank 130. The empty clam shells 10c continue along the rollers 36 and 38 to reduced portions 52 and 54, where the shells drop down to a refuse conveyor generally indicated at 56.

More specifically, feed spout 22 is connected to a storage bin (not shown) containing the clams to be processed and is associated with suitable mechanism for gradually feeding clams onto the feeding hopper 20. This feeding hopper 20 includes a pair of converging vertical plates 58 and 60 extending from a floor generally indicated at 62 having horizontal portions 64 and 66 and a central trough portion 68 which is generally V-shaped in cross-section. A vibrating mechanism is diagrammatically indicated at 70 which may be of any suitable character to vibrate the entire feeding hopper in the direction indicated by the arrow 72. The feeding hopper is also mounted to slope downwardly or from the right to the left as shown in FIGURE 2.

Still referring to FIGURE 2, rollers 26 and 28 may be rotatably mounted in suitable bearings (not shown) and a motor drive is provided to rotate these rollers in the directions indicated by the arrows in FIGURE 4. Thus, this drive includes a motor 74 drivingly connected to each roller as schematically indicated in FIGURE 2. A pulley 76 is connected to roller 26 and this pulley is drivingly connected to motor 74 by way of belt 78, pulley 80, shaft 82, pulley 84, belt 86 and motor pulley 88 connected to the motor shaft 90. Similarly, motor 74 drives roller 28 by way of a motor pulley 92 connected to motor shaft 90, belt 94, pulley 96, shaft 98, pulley 100, belt 102 and a drive pulley (not shown) connected to roller 28.

Guide wires 101a and 101b, above the rollers 26 and 28 as shown in FIGURE 4, extend along the rollers to ensure that the clams remain on edge. Similar wires 103a and 103b, shown in FIGURE 5, extend above and parallel to the rollers 36 and 38. (The wires 101a, 101b, 103a and 103b are not shown in FIGURE 2.)

It will now be seen that clams dropping onto the feeding hopper 20 fall into the trough portion 68 thereof, and due to the vibratory action of this hopper, they gradually feed downwardly or from right to left as viewed in FIGURE 2. Next, they drop between rollers 26 and 28, and as better seen in FIGURE 4, they are soon supported on these rollers with their mantle edges pointed downwardly. Because burners 32 and 34 are located beneath rollers 26 and 28, respectively, with their flame openings 32a and 34a pointing upwardly, the flame is thus directed at the mandle portion of the shell. Rollers 26 and 28 are sufficiently far apart to support clams in the position shown in FIGURE 4, and the clams soon assume the desired position on rollers 26 and 28 due to a phenomenon of nature.

It has been found that when a bivalve mollusk such as a clam stands on its mantle edge, its center of gravity is below its thickest portion and substantially spaced from its hinge. Stated in another way, the maximum thickness of a clam is indicated in the area of the dashed line 106 in FIGURE 1, and the center of gravity of a live clam is spaced below such imaginary line.

Clams such as clam 24a gradually assume an edgewise position as they travel along the V-shaped trough portion 68 and in this position they drop on rollers 26 and 28. As previously mentioned, rollers 26 and 28 are inclined downwardly or from right to left as viewed in FIGURE 2 and hence, the clams coming from trough portion 68 continue their descent along the rollers due to the rotation of the rollers. More specifically, the clams slide away from the hopper due to the inclination of the rollers 26 and 28. The rotation of these rollers in opposite directions tends to lift the on-edge clams from between them and substantially reduces the static friction forces between the clams and the rollers. Moreover, the rollers 26 and 28 are spaced apart by a distance such that when the on-edge clam is rotated to dispose its mantle edge bottommost, thereby positioning its hinge uppermost, its center of gravity is below its point of contact with the rollers. With this spacing between the rotating inclined rollers, an on-edge clam is in an unstable rotation position except when its mantle edge is disposed bottommost. Thus, although initially clams travelling along rollers 26 and 28 such as clam 24b may be in any vertical position, because of the location of the center of gravity in each clam, the clams roll upon an imaginary lateral axis as viewed in FIGURE 2 until their centers of gravity are in their lowermost position. As the clams individually assume such position, their mantle edges will be lowermost between rollers 26 and 28 exposing their mantle edges to the flame from burners 32 and 34 (FIGURE 4). The heating of the mantle edges of the clams as they move along rollers 26 and 28 opens the mantle of each clam so that the juice therein drops into a suitable trough diagrammatically indicated at 39 in FIGURE 4 where it is drained off for further processing having nothing to do with the present invention.

Referring now to FIGURES 2 and 5, rollers 36 and 38 are rotatably mounted in suitable bearings (not shown) and burner pipes 40 and 42 are disposed thereabove with their flame openings 40a and 42a positioned to direct flame downwardly on the clams passing along these rollers. Rollers 36 and 38 are driven in the directions indicated by the arrows in FIGURE 5 by a motor 108 having a drive pulley 110, a belt 112 and a pulley 114 connected to roller 36. Meshing pinions 116 and 118 connected to rollers 36 and 38, respectively, complete the driving connection between motor 108 and rollers 36 and 38.

It will be noted from an examination of FIGURE 5 that the diameter of rollers 36 and 38 and the space therebetween is such that the parted or open shells 10a and 10b of the clams such as clam 24d being fed downwardly along the rollers rest in an upward position with the hinge portion 14 uppermost. Accordingly, as will be understood from an examination of FIGURE 5, the flames from the burner pipes 40 and 42 are directed at that portion of the shells adjacent the glossy portions 12 (FIGURE 1) or the ciboria where the shell retracting adductor muscles are attached. The heating of the shells in this manner by the burner pipes 40 and 42 dislodges the muscles at these points and the shells are then forced apart by the ligament 16 to rapidly assume the open position shown in FIGURE 5, thus preparing the clam for the final operation of removing the meat therein.

Referring now to FIGURE 3, the photoelectric cell 48 is suitably supported above and between rollers 36 and 38, and a suitable light source 120 is located forwardly thereof and beneath the rollers in a position to direct the beam of light 46 at cell 48. Thus, this beam 46 angularly sweeps between the rollers and thereacross unless interrupted by one of the clams being fed along the rollers, in which event the beam is interrupted to send a signal to certain controlling equipment associated with a vacuum source which will now be described.

Thus, as diagrammatically indicated in FIGURE 2, there is provided a tank 51 with a pump 122 connected thereto by a pipe 124. Suitable controlling mechanism (not shown) regulates the operation of the pump to maintain a desired vacuum in the tank. As previously described, nozzle 44 has its upper open end 44a immediately beneath and adjacent the nip of rollers 36 and 38. Tank 51 is connected to nozzle 44 by way of conduit 126 having interposed therein an electrically actuated valve mechanism 128. Photoelectric cell 48 is connected to suitable electrical equipment (not shown) which opens valve mechanism 128 whenever it is de-energized by the breaking of beam 46 (FIGURE 3). A tank 130 beneath rollers 36 and 38 (FIGURE 2) surrounds the nozzle 44 and is supported in any suitable manner so that the level of the water in the tank is above the bottom of the nozzle. Conduit 126 connects to nozzle 44 sufficiently above the water level in tank 130 to prevent the vacuum from drawing water into the conduit. As previously noted, portions 52 and 54 of rollers 36 and 38 are reduced in diameter so that as empty clam shells are dropped thereon, there is sufficient space therebetween to allow the shells to drop free. Such empty shells drop on a conveyor 56 which carries them away from the presently described apparatus.

It will now be seen that as clams such as clam 24c break beam 46 by being fed thereby (FIGURE 3), the clams are immediately above the open end 44a of nozzle 44. At this time, the beam 46 being broken, the valve mechanism 128 is opened to apply a vacuum to nozzle 44 via conduit 126 and this sucks the meat from each clam. Conduit 126 is connected to nozzle 44 at a point far enough down from the open end 44a thereof so that the forces of gravity will overcome the vacuum being pulled on the side of the nozzle to allow the meat from the clams to drop free and clear into the water in tank 130. The empty shells then continue along rollers 36 and 38 to drop down from reduced portions 52 and 54 onto the conveyor 56. The clam flesh can be removed from the tank 130 with conventional conveying or the like equipment.

A clam which fails to open after being heated by the burner pipes 40 and 42 is ejected from between the rollers 36 and 38 prior to interrupting light beam 46 (FIGURE 3). This is achieved by a hydraulic valve 132 as shown in FIGURE 3 suitably supported below the rollers 36 and 38 with an actuator 134 extending between the rollers so that it will be depressed by an unopened clam. An opened clam such as clam 24c with its shells in the open position illustrated in FIGURE 5 passes by the actuator 134 without depressing it. Valve 132 is interposed in a hydraulic system (not shown) by way of a line 136 to control the operation of a cylinder 138 shown in FIGURE 2 mounted above the rollers 36 and 38 and fitted with a piston rod 140 having an ejector 142 extending therefrom. When the actuator 134 (FIGURE 3) is depressed by an unopened clam, it operates valve 132 to actuate cylinder 138 and move piston rod 140 outwardly. This moves ejector 142 against the unopened clam to eject it from rollers 36 and 38.

It has been found that less heat is required to release a clam's mantle and its adductor muscles when the clam is briefly exposed to a heated fluid prior to delivery to the machine shown in FIGURE 2. This can be achieved for example with conventional hot dip apparatus that briefly exposes the clams to a heated fluid such as water prior to their delivery to the feeding spout 22 (FIGURE 2). The clams remain alive during the hot dip operation, but thereafter their mantles and adductor muscles can be released with less heat than would otherwise be required. Thus, the clams remain alive and uncooked throughout the hot dip operation and their shells remain sealed.

By use of the above described method and apparatus, flesh from bivalve mollusks having maximum commercial value may be efficiently recovered. Such flesh is uncooked, has maximum storage life, and has a fresh, translucent appearance to be commercially attractive. In addition, essentially all the flesh from the mollusks is recovered in a substantially unshredded and untorn condition.

It will thus be seen that the objects set forth above, among those made apparent from the preceding description, are efficiently attained and, since certain changes may be made in carrying out the above process without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein, and all statements of the scope of the invention, which, as a matter of language, might be said to fall therebetween.

Having described the invention, what is claimed as new and secured by Letters Patent is:

1. A method for opening a bivalve mollusk by enabling the mollusk's hinge ligament to separate the mollusk's shells, said method comprising the successive steps of
    (A) draining substantially all free fluid from within the mollusk while its shells are substantially closed, and thereafter
    (B) heating the mollusk's shell at the region where its adductor muscle is attached to the shell.

2. The method defined in claim 1 in which said fluid draining step comprises
    releasing a portion of the mollusk's mantle from the shell,
    thereby forming an opening between the mantle and the shell through which the fluid drains.

3. A method of opening a bivalve mollusk by enabling the mollusk's hinge ligament to separate the mollusk's shells, said method comprising the successive steps of
    (A) removing excess fluid from within the mollusk while its shells are substantially closed by
        (1) positioning the mollusk on edge with its hinge portion substantially uppermost, and
        (2) heating the pallial line of the mollusk's shell to release a portion of the mantle from the shell, so that excess fluid drains from the mollusk, and
    (B) heating the mollusk's shell at the region where its adductor muscle is attached to the shell while the mollusk is oriented on edge with its hinge portion substantially uppermost.

4. The method defined in claim 3 further comprising the step of briefly immersing said mollusk in a heated liquid prior to said heating steps.

5. A method for recovering the flesh from a bivalve mollusk substantially without cooking the flesh, said method comprising the steps of
    (A) orienting the mollusk on edge with its hinge portion substantially uppermost, (B) heating the ciboria of the mollusk's shells
　(1) to release the mollusk's adductor muscles from its shells,
　(2) so that the mollusk's hinge ligament can separate the two shells to expose the mollusk's flesh, and
(C) removing the mollusk's flesh from the shells.

6. The method defined in claim 5 in which said flesh removing step comprises the steps of vacuum shucking the flesh from the shells.

7. The method defined in claim 6, further comprising the step of removing fluid from within the mollusk prior to heating the ciboria.

8. A method for recovering the flesh from a bivalve mollusk substantially without cooking the flesh, said method comprising the successive steps of
(A) positioning the mollusk on edge,
(B) orienting the on-edge mollusk with its hinge portion substantially uppermost,
(C) heating the region on the outside of the mollusk's shells coinciding with the pallial lines,
　(1) to allow excess juice to drain from within the mollusk's shells,
(D) heating the region on the outside of the mollusk's shells coinciding with the ciboria,
(E) allowing the mollusk's hinge ligament to separate its shells, and
(F) removing the mollusk's flesh from within the opened shells.

9. In the opening of a bivalve mollusk, a method comprising the successive steps of (A) engaging the mollusk and orienting it on its edge with the hinge portion substantially uppermost, and
(B) heating the on-edge mollusk in the region of its shell coinciding with the ciborium.

10. In a process for opening a bivalve mollusk, the successive steps of
(A) exposing the mollusk to a heated fluid with the fluid temperature and the exposure time being such that the mollusk remains alive with its shells sealed,
(B) orienting the mollusk on-edge, and
(C) heating the on-edge mollusk in the region of its shell coinciding with the ciborium.

11. A process according to claim 10 further comprising the steps of
(A) positioning the on-edge mollusk to dispose its hinge portion substantially uppermost prior to said ciborium heating step, and
(B) maintaining the mollusk in said on-edge, hinge uppermost position during said ciborium heating step.

References Cited by the Examiner
UNITED STATES PATENTS

| | | | |
|---|---|---|---|
| 2,626,701 | 1/1953 | Avetta et al. | 198—79 |
| 2,862,606 | 12/1958 | Schlichting | 198—165 |
| 2,942,292 | 6/1960 | Rey | 17—45 |

SAMUEL KOREN, *Primary Examiner.*

LUCIE H. LAUDENSLAGER, *Examiner.*